(No Model.)
D. DUNN.
AIR BRAKE.
No. 567,024.  Patented Sept. 1, 1896.
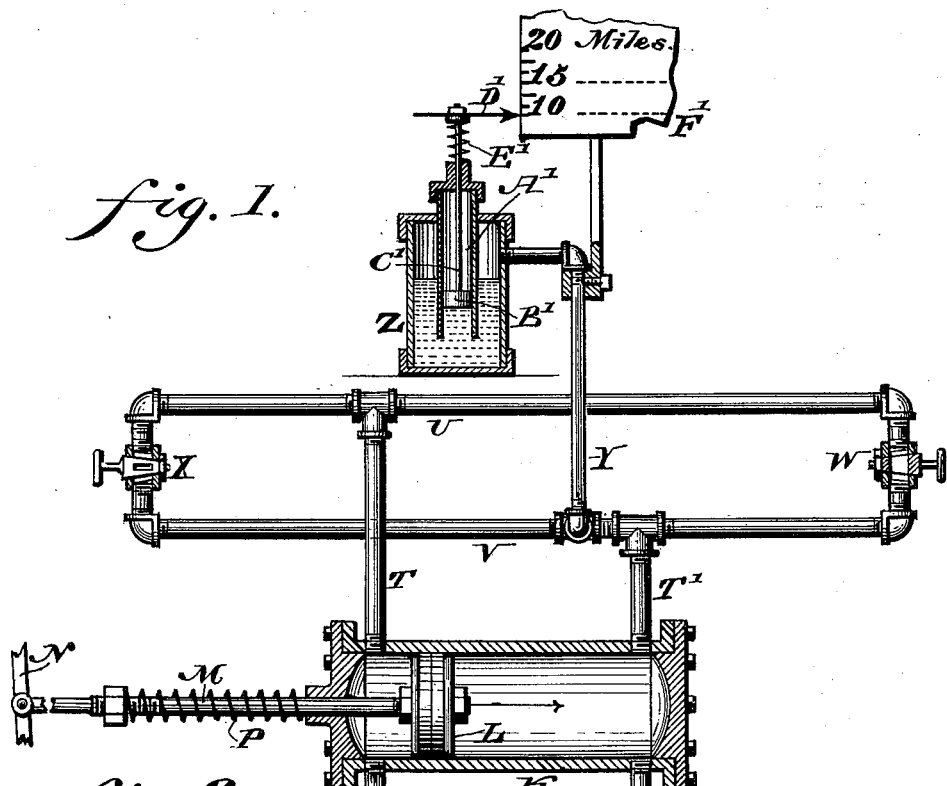
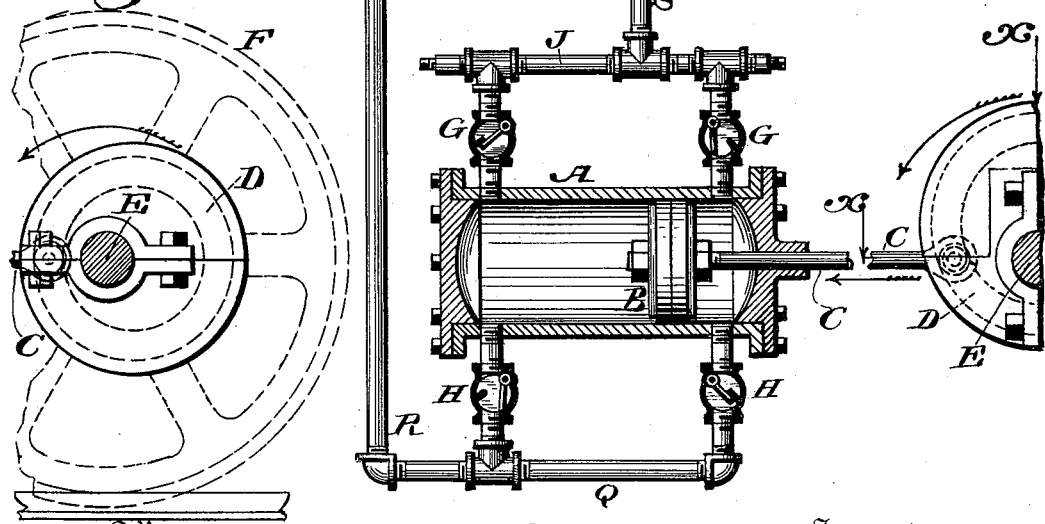
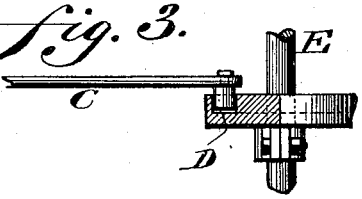
Witnesses
L. Douville,
P. F. Sragle.
Inventor
Dennis Dunn
By John A. Wiedersheim
Attorney

UNITED STATES PATENT OFFICE.

DENNIS DUNN, OF MAHANOY CITY, PENNSYLVANIA, ASSIGNOR OF ONE-HALF TO JOHN E. REYBURN, OF PHILADELPHIA, PENNSYLVANIA.

AIR-BRAKE.

SPECIFICATION forming part of Letters Patent No. 567,024, dated September 1, 1896.

Application filed July 31, 1895. Serial No. 557,699. (No model.)

*To all whom it may concern:*

Be it known that I, DENNIS DUNN, a citizen of the United States, residing at Mahanoy City, in the county of Schuylkill, State of Pennsylvania, have invented a new and useful Improvement in Air-Brakes, which improvement is fully set forth in the following specification and accompanying drawings.

My invention consists of an air-brake in which an air-compressor is adapted to be operated by one of the wheels of a car and connected with mechanism whereby when the brakes are to be applied the air may be exhausted from one end of the brake-cylinder and impacted against the piston thereof at the opposite end, so as to actuate the brake-levers. When, however, service of the brake is not required, air may circulate freely through the parts of the device, thus balancing the pressure on said piston, whereby the brake mechanism is not affected.

Figure 1 represents a partial side elevation and partial section of an air-brake embodying my invention. Fig. 2 represents a vertical section of a portion thereof. Fig. 3 represents a partial top view and partial horizontal section of a detached portion.

Similar letters of reference indicate corresponding parts in the several figures.

Referring to the drawings, A designates a compressor, and B the piston thereof.

C designates the rod of said piston, the outer end of the same being engaged by the eccentric or eccentric-groove D on the axle E of the car-wheel F, as shown in dotted lines in the figures, by which provision said piston may be continuously operated.

G G designate valves which are connected with opposite ends of the cylinder of the compressor A, and H designates valves which are also connected with opposite ends of said cylinder, but at places different from the valves G.

J designates a pipe which is connected with the valves G and with the brake-cylinder K, which contains the piston L, whose stem M is connected with the brake-levers N and provided with a spring P for returning said piston and consequently the levers N to their normal positions.

Q designates a pipe which is connected with the valves H and with the pipe R, the latter being in communication with one end of the brake-cylinder K.

S designates a pipe which is connected with the pipe J and communicates with the end of the brake-cylinder opposite to the pipe R. Connected with opposite ends of the brake-cylinder are pipes T T', the pipe T being connected with the pipe U and the pipe T' being connected with the pipe V, said pipes U and V being coupled at their ends by the cocks W and X.

Y designates a pipe which is connected with the cylinder or reservoir Z, within which latter depends the tube A', which is in communication at its bottom with said cylinder Z and has within it the follower or head B', whose stem C' passes freely through the cap of the cylinder and carries an index D', and interposed between said cap and secured to said parts is the spring E' for returning said follower to its normal position.

F' designates a dial or plate which is supported in any suitable manner adjacent to the index D' and has graduations for miles or distances thereon.

It will be seen that when the car is started, one of the cocks W X being opened and the other one consequently closed, the piston of the compressor will be operated, and when the car is to be stopped the open cock will be closed, whereby the air is drawn from the brake-cylinder K through the pipes S J and valves G into the cylinder of the compressor A, thus exhausting the air in said brake-cylinder. The air is, however, drawn from the cylinder A through the valves H into the pipe Q, and from thence through the pipe R into the end of the brake-cylinder opposite to the pipe S, whereby the piston L will be moved in the present case in the direction of the arrow. As the stem M follows said piston the attached levers will be operated and the brake applied, thus effecting the stopping of the car. When the car is again to be started, the cock that has been closed will be opened, and as the piston B is operated by the car-wheel the air is drawn from the air-cylinder and directed through the several pipes S J and valves G and the compressor A to the pipes Q and R into the other end of the brake-cylinder, and from thence through the pipe T into the pipes U and V, and next into the pipe T', by which it is directed into the brake-cylinder, and thus the circulation of the air continues throughout the device, it being seen that the pressure of the air on the piston of the brake-cylinder is balanced, whereby the same remains at rest and the brakes are not operated. As air enters the pipe Y from the pipe V it is directed into the reservoir Z, which contains a body of fluid whose level is above the bottom of the tube A, whereby the pressure of the air in said fluid forces some of the latter into said tube, and thus raises the head B', and with it the index D', the latter moving over or down over the dial or graduated plate F', according to the variations in the pressure of the fluid in the reservoir, said variations resulting from the increase or decrease in the speed of the car, whereby a greater or less volume of air is forced into the reservoir.

Having thus described my invention, what I claim as new, and desire to secure by Letters Patent, is—

1. In an air-brake, a brake-cylinder, connections from the piston thereof to the brake mechanism, an air-compressor, pipes leading from each end of said brake-cylinder to the suction and discharge of said compressor, other pipes leading from the ends of said cylinder to conduits in communication with each other, and valves in said conduits, substantially as described.

2. The brake-cylinder K, the pipes S and R leading from opposite ends thereof, the pipe J connected with said pipe S, the pipe Q connected with said pipe R, the compressor A, the valves G connected with said pipe S and opposite ends of the cylinder of said compressor, the valves H connected with opposite ends of said cylinder and with said pipe Q, the pipes T, T' connected with opposite ends of the cylinder K, the pipes U and V connected with said pipes T, T', and a cock intermediate of said pipes U and V, said parts being combined substantially as described.

3. In an air-brake, a brake-cylinder, connections from the piston thereof to the brake mechanism, an air-compressor, pipes leading from each end of said brake-cylinder to the suction and discharge of said compressor, and other pipes leading from the ends of said cylinder to valved conduits in communication with each other, in combination with a reservoir having a fluid therein, in communication with said conduits, an open-bottom tube in said reservoir, submerged in said fluid, a head in said tube having a stem attached thereto, and passing through the cap thereof, and an index on said stem, substantially as described.

4. An air-brake embodying a brake-cylinder, means for exhausting air from one end of said cylinder, and causing it to impact against the piston thereof at the opposite end, and valved connections for circulating air throughout a portion of the device, whereby the brake mechanism is not affected, in combination with a pipe leading from said connections, a reservoir having fluid therein in communication with said pipe, an open-bottom tube in said reservoir dipping into said fluid, a head in said tube, a stem attached to said head, and an index on said stem, substantially as described.

5. An air-brake embodying a brake-cylinder, means for exhausting air from one end of said cylinder, and for causing it to impact against the piston thereof at the opposite end, in combination with pipes leading from the ends of said cylinder to conduits, in communication with each other, and valves in said conduits, substantially as described.

6. An air-brake consisting of a brake-cylinder, having a piston with a returning-spring, a compressor having valved pipes leading from opposite ends thereof, to the opposite ends of the said brake-cylinder, a reservoir with a pressure-head therein, an indicating device actuated thereby, and valved pipes leading from said reservoir to opposite ends of said brake-cylinder, said parts being combined substantially as described.

7. An air-brake, consisting of the compressor A, means for actuating the same, the brake-cylinder K, a piston therefor, having connections leading to its brake mechanism, the pipe J having branches leading to opposite ends of said compressor and provided with the valves G, the pipe Q with valved branches leading to opposite ends of said compressor, the pipes S and R connected respectively with said pipes J and Q, and leading to opposite ends of said brake-cylinder, an air-reservoir with a pressure-head and valved connections from said reservoir to opposite ends of said brake-cylinder, said parts being combined substantially as described.

DENNIS DUNN.

Witnesses:
JOHN A. WIEDERSHEIM,
A. P. JENNINGS.